US011588785B2

(12) United States Patent
de la Oliva et al.

(10) Patent No.: US 11,588,785 B2
(45) Date of Patent: Feb. 21, 2023

(54) METHODS AND PROCEDURES FOR THE DYNAMIC MAC ADDRESS DISTRIBUTION IN IEEE 802.11 NETWORKS

(71) Applicant: INTERDIGITAL PATENT HOLDINGS, INC., Wilmington, DE (US)

(72) Inventors: Antonio de la Oliva, Madrid (ES); Carlos Jesus Bernardos, Madrid (ES); Robert G. Gazda, Spring City, PA (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 17/257,361

(22) PCT Filed: Jul. 2, 2019

(86) PCT No.: PCT/US2019/040373
§ 371 (c)(1),
(2) Date: Dec. 31, 2020

(87) PCT Pub. No.: WO2020/010126
PCT Pub. Date: Jan. 9, 2020

(65) Prior Publication Data
US 2021/0168115 A1 Jun. 3, 2021

Related U.S. Application Data

(60) Provisional application No. 62/815,800, filed on Mar. 8, 2019, provisional application No. 62/758,194, filed
(Continued)

(51) Int. Cl.
*G06F 15/177* (2006.01)
*H04L 61/5092* (2022.01)
(Continued)

(52) U.S. Cl.
CPC ...... *H04L 61/5092* (2022.05); *H04L 61/4541* (2022.05); *H04L 61/5038* (2022.05);
(Continued)

(58) Field of Classification Search
None
See application file for complete search history.

(56) References Cited

U.S. PATENT DOCUMENTS 9,131,373 B2 9/2015 Patil et al.
9,788,185 B2 10/2017 Seok et al.
(Continued)

FOREIGN PATENT DOCUMENTS

JP 2011-135325 7/2011
TW 201427361 A * 8/2014 ............ H04W 12/06
(Continued)

OTHER PUBLICATIONS

Cotton et al., "Internet Assigned Numbers Authority (IANA) Procedures for the Management of the Service Name and Transport Protocol Port Number Registry," Internet Engineering Task Force (IETF), RFC 6335 (Aug. 2011).
(Continued)

*Primary Examiner* — Phyllis A Book
(74) *Attorney, Agent, or Firm* — Volpe Koenig

(57) ABSTRACT

Methods and apparatuses are described for dynamic medium access control (MAC) address distribution in a wireless network. A station (STA) may receive, from an access point (AP), a frame that includes an indicator indicating at least one MAC address type or MAC address policy supported by an extended service set (ESS) associated with the AP. The indicator may comprise an 8 bit bitmap. The STA may then transmit, to the AP, a request message that includes MAC Address Assignment Protocol information determined based on the at least one MAC address type or MAC address
(Continued)

policy. The STA may receive a response message that includes a local medium access control (MAC) address assigned based on the MAC Address Assignment Protocol information. The STA may transmit, to the AP, an association request frame with the local MAC address.

20 Claims, 13 Drawing Sheets

Related U.S. Application Data on Nov. 9, 2018, provisional application No. 62/694,311, filed on Jul. 5, 2018.

(51) Int. Cl.
| | |
|---|---|
| H04W 8/26 | (2009.01) |
| H04W 48/14 | (2009.01) |
| H04W 48/20 | (2009.01) |
| H04L 61/4541 | (2022.01) |
| H04L 61/5038 | (2022.01) |
| H04L 101/622 | (2022.01) |

(52) U.S. Cl.
CPC ............ *H04W 8/26* (2013.01); *H04W 48/14* (2013.01); *H04W 48/20* (2013.01); *H04L 2101/622* (2022.05)

(56) References Cited

U.S. PATENT DOCUMENTS

| | | | |
|---|---|---|---|
| 10,750,435 B2 | 8/2020 | McCann et al. | |
| 2003/0177267 A1 | 9/2003 | Orava et al. | |
| 2014/0092779 A1* | 4/2014 | Seok | H04W 48/16 370/254 |
| 2014/0254502 A1* | 9/2014 | Cai | H04W 48/20 370/329 |
| 2015/0063205 A1 | 3/2015 | Elliott | |
| 2016/0302145 A1* | 10/2016 | Kasslin | H04W 28/08 |
| 2017/0078408 A1 | 3/2017 | Lepp et al. | |
| 2017/0215129 A1* | 7/2017 | McCann | H04L 67/28 |
| 2017/0230903 A1* | 8/2017 | Yang | H04W 48/16 |
| 2019/0069222 A1* | 2/2019 | McCann | H04W 4/50 |
| 2019/0082383 A1* | 3/2019 | Chen | H04W 48/20 |

FOREIGN PATENT DOCUMENTS

| | | |
|---|---|---|
| WO | 2016/068759 | 5/2016 |
| WO | 2019/242992 | 12/2019 |

OTHER PUBLICATIONS

De La Oliva et al., "MAC address assignment in IEEE 802.11 through IEEE 802.11 aq," IEEE 802.11-18/1934r1 (Nov. 14, 2018).

De La Oliva et al., "Proposal for IEEE 802.1CQ (Self-Assignment Part)," CQ-AOLIVA-Proposal-Selfassignmenttext-0318, pp. 1-10 (Mar. 5, 2018).

De La Oliva et al., "Proposal for IEEE 802.1CQ-LAAP," OMNIRAN-18-0035-00-CQOO-Proposal-for-IEEE-802-1CQ-LAAP, pp. 1-11 (Mar. 29, 2018).

Droms et al., "Dynamic Host Configuration Protocol for IPv6 (DHCPv6)," Network Working Group, RFC 3315 (Jul. 2003).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Preassociation Discovery IEEE Std 802.11aq-2018 (Jun. 14, 2018).

IEEE Standard for Local and Metropolitan Area Networks: Overview and Architecture; Amendment 2: Local Medium Access Control (MAC) Address Usage, IEEE Std 802c-201/(Jun. 15, 2017).

WiFi Alliance, "Discover Wi-Fi Passpoint," (Jun. 8, 2018) available at https://web.archive.org/web/20180608102331/https://www.wi-fi.org/discover-wi-fi/passpoint.

Yong, "Aligning 11aq to Upper Layer SD," IEEE 802.11-17/0782r1 (May 7, 2017).

* cited by examiner

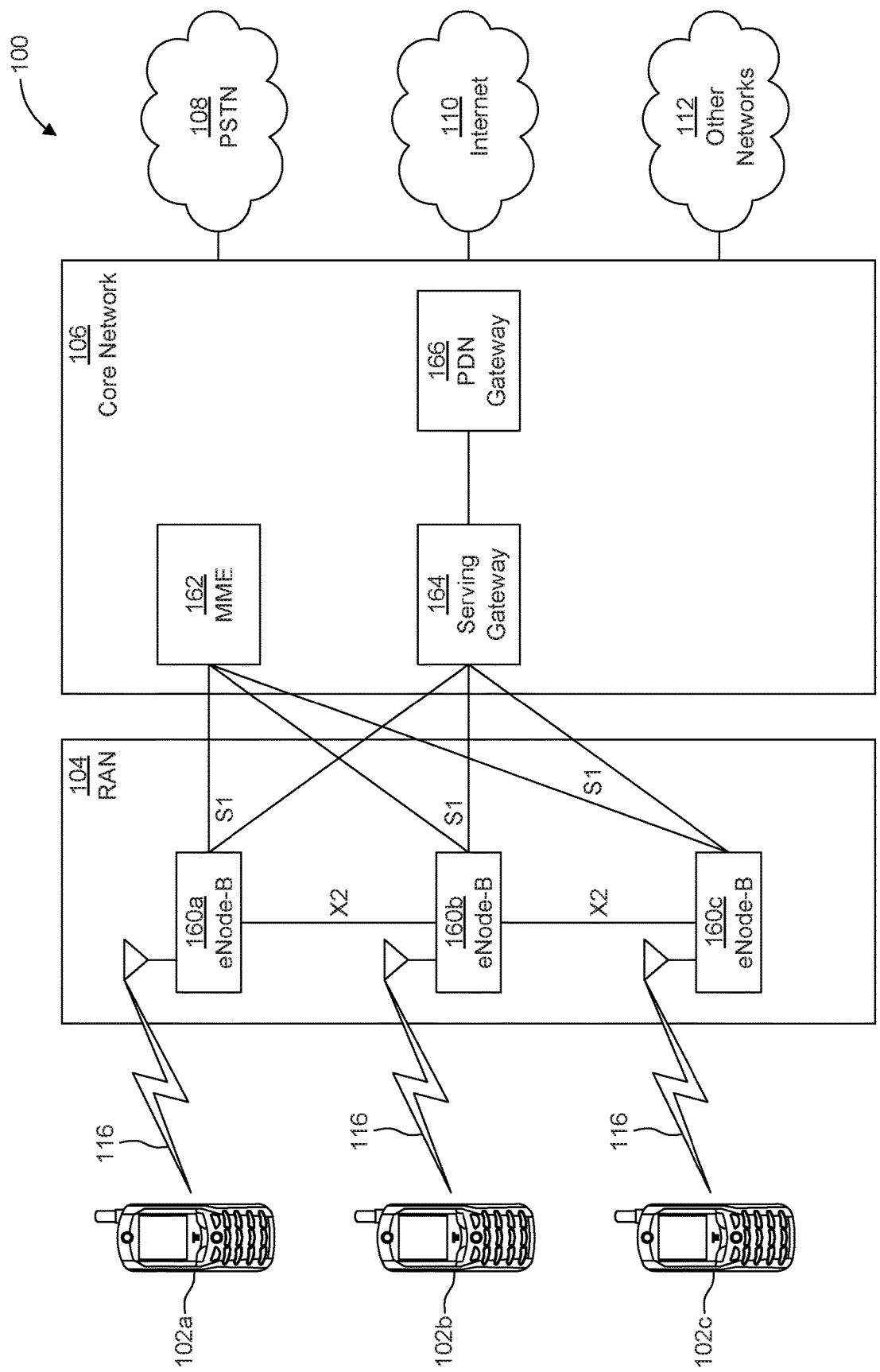

| SLAP Quadrant | Y Bit | Z Bit | SLAP Local Identifier Type | SLAP Local Identifier |
|---|---|---|---|---|
| 01 | 0 | 1 | Extended Local | ELI |
| 11 | 1 | 1 | Standard Assigned | SAI |
| 00 | 0 | 0 | Administratively Assigned | AAI |
| 10 | 1 | 0 | Reserved | Reserved |

METHODS AND PROCEDURES FOR THE DYNAMIC MAC ADDRESS DISTRIBUTION IN IEEE 802.11 NETWORKS

CROSS-REFERENCE TO RELATED APPLICATIONS

This application is the U.S. National Stage, under 35 U.S.C. § 371, of International Application No. PCT/US2019/040373 filed Jul. 2, 2019, which claims the benefit of U.S. Provisional Application No. 62/694,311, filed Jul. 5, 2018, U.S. Provisional Application No. 62/758,194, filed Nov. 9, 2018, and U.S. Provisional Application No. 62/815,800, filed Mar. 8, 2019, the contents of which are incorporated herein by reference.

BACKGROUND

Institute of Electrical and Electronics Engineers (IEEE) 802.11 networks require that a device, such as 802.11 stations (STA), have a medium access control (MAC) address before associating with an access point (AP). In the context of IEEE 802c and IEEE 802.1CQ, a device needs to acquire, or claim, a MAC address from the network. Thus, in order to support IEEE 802c and IEEE 802.1CQ, Wireless Local Area Networks (WLANs) need to offer a MAC Address Assignment Protocol in the pre-association discovery (PAD) stage, before a device has associated with an AP. After the MAC address assignment, the device can be connected and associated with an AP in the WLAN. Additionally, in a WLAN, state and security associations consider the MAC address information. Any changes in the STA's MAC address will trigger a new association, new authentication, or the like. The STA may need to rebind a previously assigned MAC address due to mobility. Thus, methods and apparatuses that can configure and assign a STA's MAC address in the PAD stage are needed.

SUMMARY

Methods and apparatuses are described herein for dynamic medium access control (MAC) address distribution in Institute of Electrical and Electronics Engineers (IEEE) 802.11 networks. For example, a station (STA) may receive, from an access point (AP), a frame comprising an indicator indicating at least one MAC address type or MAC address policy supported by an extended service set (ESS) associated with the AP. The indicator may comprise an 8 bit bitmap. The at least one MAC address policy may comprise a self-assignment, a self-assignment with a predetermined prefix, and a MAC Address Assignment Protocol server availability. The frame may be an ANQP frame and may include at least one of a service hint element or a service hash element to be used to determine the at least one MAC address type or MAC address policy. The STA may then transmit, to the AP, a request message that includes MAC Address Assignment Protocol information determined based on the at least one MAC address type or MAC address policy. The STA may receive a response message that includes a local MAC address assigned based on the MAC Address Assignment Protocol information. The STA may transmit, to the AP, an association request frame with the local MAC address.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

DETAILED DESCRIPTION

Figure 1A:
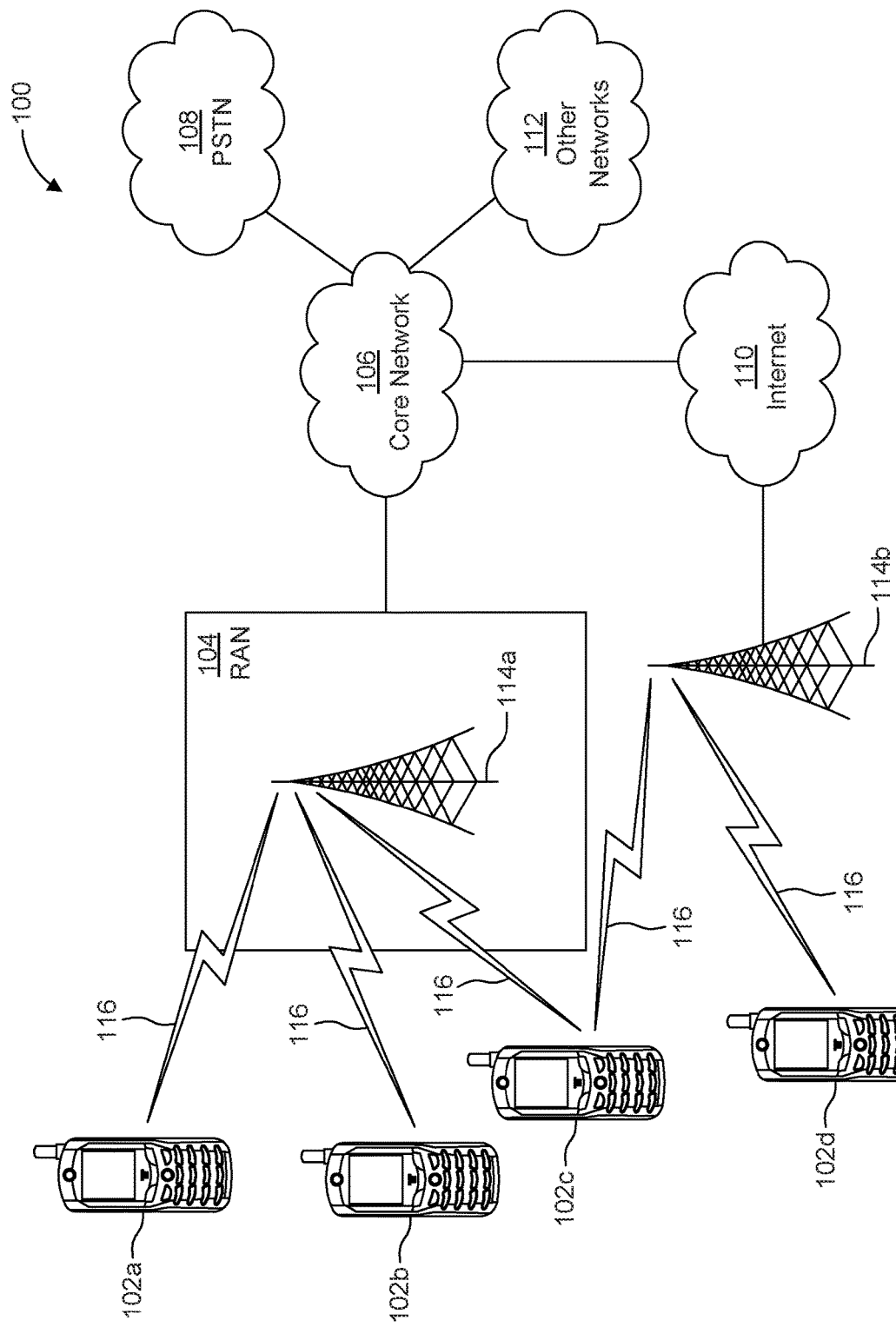
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
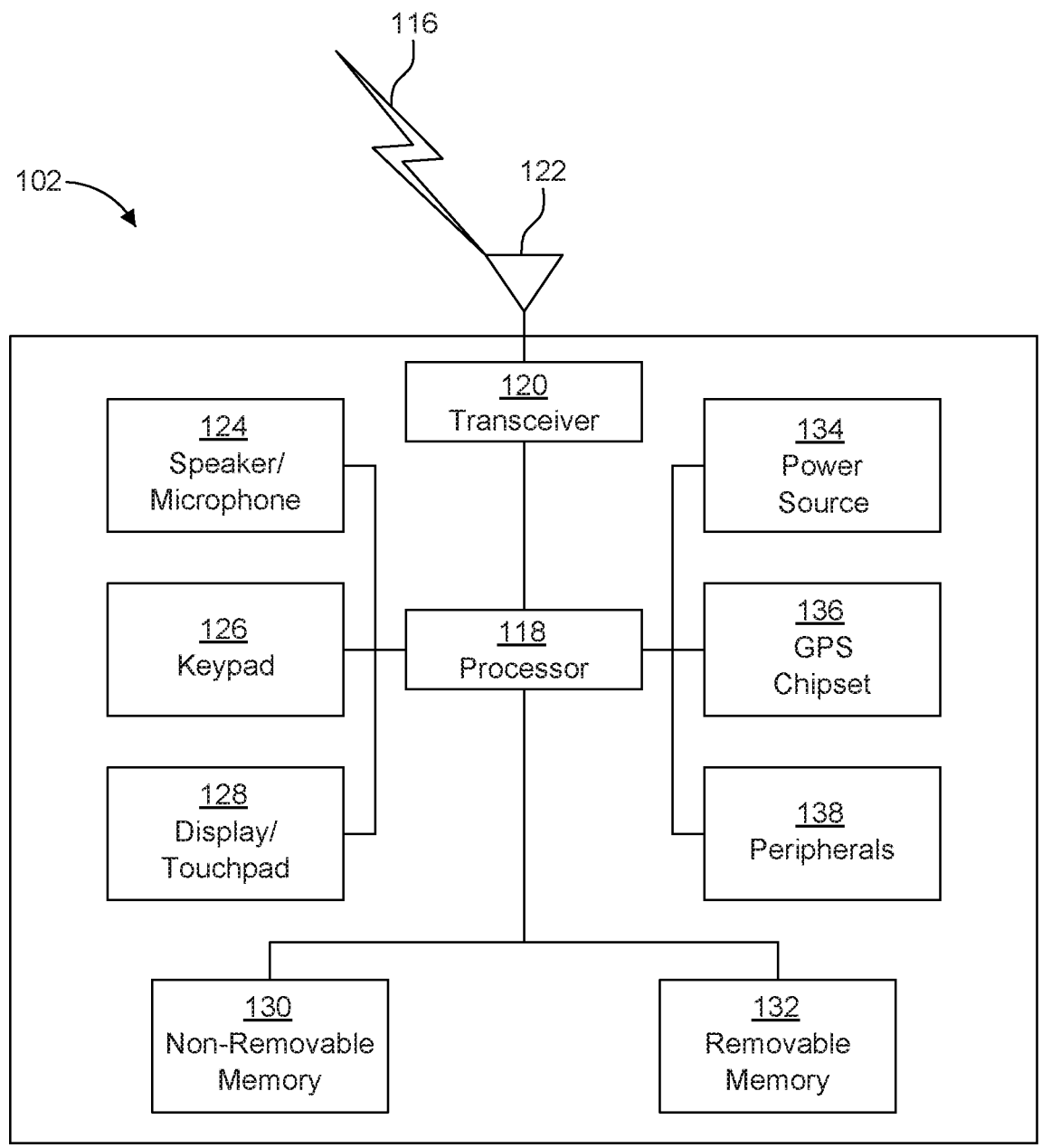
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
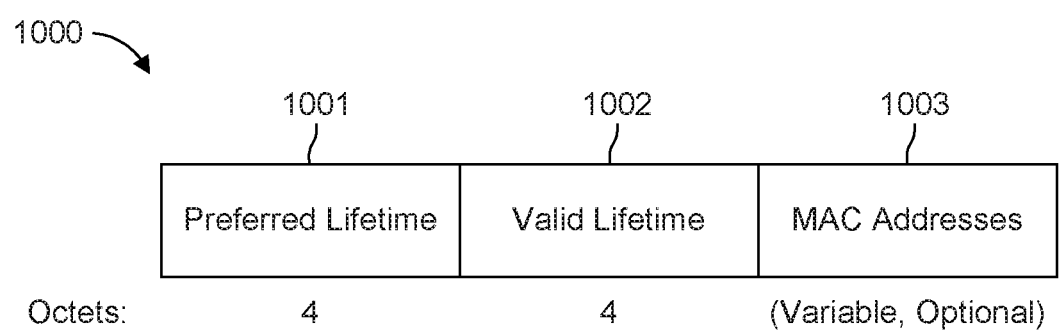
FIG. 10 shows an example of a format for an L2 Address Option.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
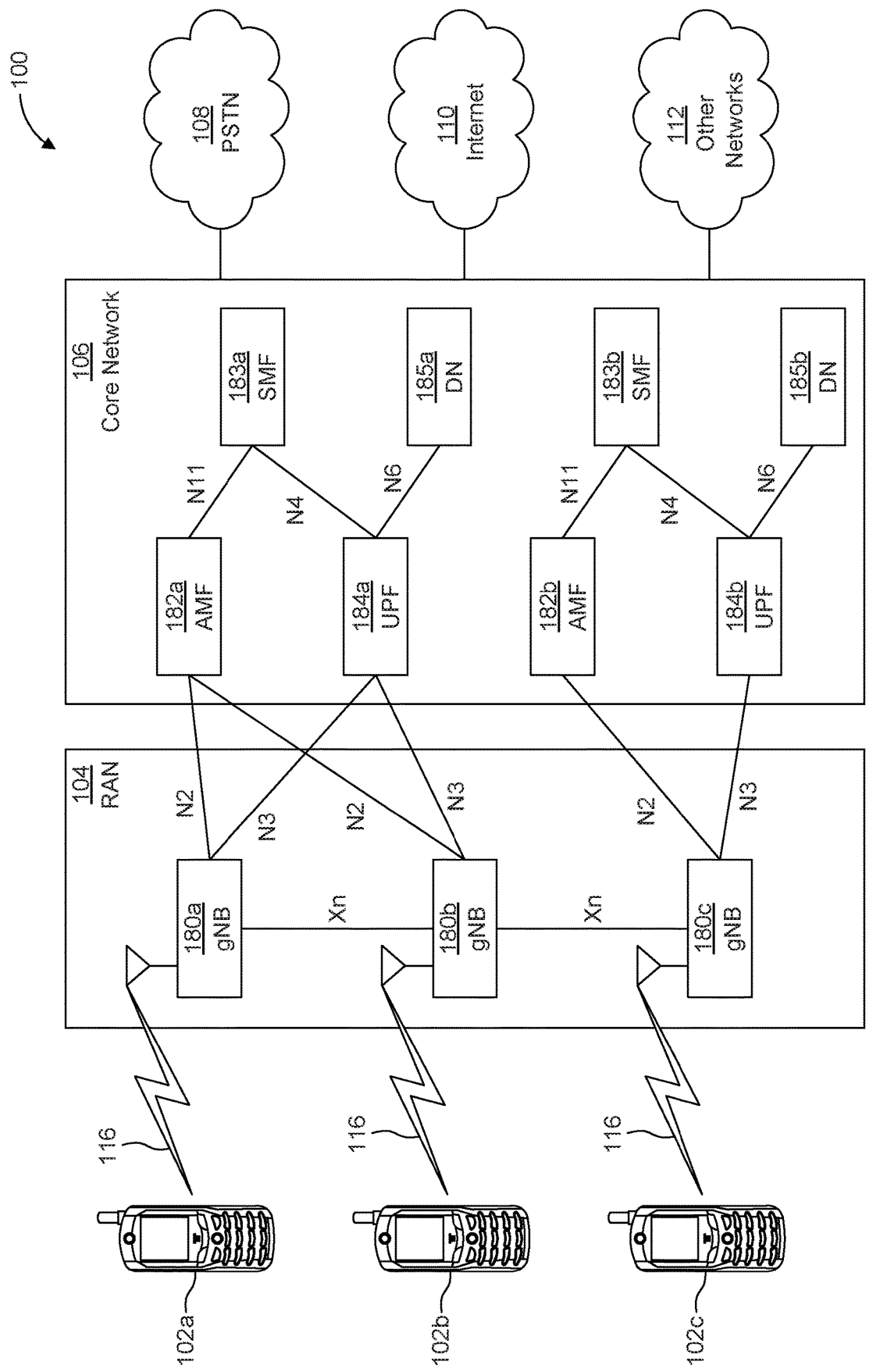
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be configured to test other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, or all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. In embodiments, the one or more emulation devices may be test equipment. Direct RF coupling and/or wireless communications via RF circuitry (e.g., which may include one or more antennas) may be used by the emulation devices to transmit and/or receive data.

For example, the IEEE 802.1CQ project is working on a standard that includes protocols, procedures, and management objects for locally-unique assignment of 48-bit and 64-bit addresses in IEEE 802 networks. Peer-to-peer address claiming ("claiming of addresses") and address server capabilities are in scope of the IEEE 802.1CQ standard. This protocol aims at providing methods at layer 2 to automatically assign local MAC addresses in the Standards Assigned Identifier (SAI) space. The SAI space is reserved for use of IEEE 802.1CQ. Two methods of MAC address assignment are in the IEEE 802.1CQ scope: self-assignment (i.e. "claiming of addresses") and service based assignment.

IEEE 802.11 includes mechanisms to notify STAs (i.e. devices) regarding services available in a WLAN network before the STA associates with an AP. This may reduce the overhead of stations connecting and associating with networks, however their required services may not be present. For example, IEEE 802.11aq enables the pre-association discovery (PAD) of services. PAD is an interworking function that enables a STA, prior to association, to discover information related to the services that are available on a WLAN network, also called the extended service set (ESS). PAD provides a method for the STA to gather this service information before selecting a WLAN network for association. PAD methods include: beacon advertisements, service hint and service hash, and the generic advertisement service (GAS)/Access Network Query Protocol (ANQP).

There is a need to configure and assign STA MAC addresses according to IEEE 802.1CQ in the PAD state. There is also a need to provide a mechanism for a mobile device to discover that an IEEE 802.11 network is offering an 802.1CQ MAC address type the PAD state. Once discovered, there is a need for a mechanism for a STA in PAD to interact with the MAC address type to acquire or rebind a MAC address via IEEE 802.1CQ methods. Further, mechanisms are needed by which the STA and AP can be mutually authenticated, to ensure that the STA that just acquired a MAC address is the same one connecting with this address to the AP and vice versa.

It may be assumed herein that a terminal is capable of obtaining a locally-unique MAC address, either by self-claiming or by assignment from a server. Methods to discover the one or more IEEE 802.1CQ mechanisms to be used in the network for MAC address assignment, considering a PAD state are described herein. Mechanisms to reach a MAC Address Assignment Protocol Proxy/Server, through a PAD state of a WLAN AP are described herein. An extension to IEEE 802.11 authentication (request and response) frames in order to mutually authenticate the STA and the AP is also described herein.

A method for discovery of IEEE 802.1CQ capabilities in an IEEE 802.11 network is proposed herein. Initially, the STA needs to understand if a WLAN that is being considered for association supports IEEE 802.1CQ mechanisms and, if so, what mechanism the STA should utilize to obtain a MAC address that is valid in the network, prior to associating to the AP. This may be done through several mechanisms. For example, a new element may be included in the Beacon, Probe Response and DMG beacon which indicates the IEEE 802.1CQ mechanism to be used by the STA. In another example, a Service Hint and Service Hash may be used to advertise new services related to IEEE 802.1CQ. In another example, the ANQP list of queries may be extended to include IEEE 802.1CQ. This may require a dialogue between the AP and STA to gather the information.

Advertisement of IEEE 802.1CQ capabilities through new Elements in the Beacon, Probe Response and DMG Beacon is proposed. In order to advertise IEEE 802.1CQ features in a beacon, the Extended Capabilities Element (as defined in clause 9.4.2.27 of IEEE 802.11-2016) may need to indicate IEEE 802.1CQ and the definition of new elements may need to be provided in the information fields of beacons and probe response messages.

For example, IEEE 802.1CQ support may be added to the definition of an element in the Extended Capabilities Element as defined in IEEE 802.11. An example of a possible definition is shown in Table 1.

TABLE 1

| Bit | Information | Notes |
|---|---|---|
| 76 (as an example, next bit is used to PAD for IEEE 802.1CQ) | IEEE 802.1CQ | Network supports IEEE 802.1CQ MAC Address Assignment Protocol mechanisms |

The Extended Capabilities Element may provide the STA with information on the which features are supported by or present in the network. The Extended Capabilities Element may further include information about the features supported by or present in the network. Therefore, a new Element is defined to provide the actual information on which MAC Address Assignment Protocol mechanism may be used in the network.

Figure 2:
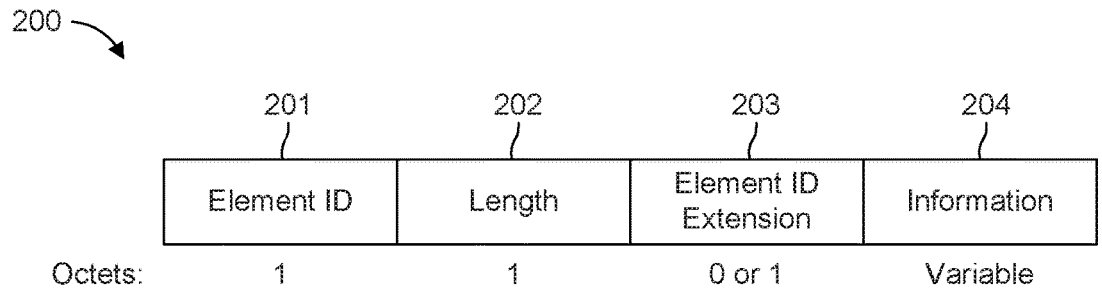
FIG. 2 shows an example of element ID exchanged in Beacons and Probe Response.

FIG. 2 shows an example structure of Element IDs 200 exchanged in Beacons and Probe Response messages. The Element IDs 200 may include a byte Element ID identifying the element 201, a byte defining the length 202, a bit defining if the Element ID is defined as an Extension 203 (i.e. the maximum number of Elements IDs have been already reached) and the actual information carried in the Element ID 204.

For IEEE 802.1CQ, a new element may provide information on the MAC Address Assignment Protocol mechanism to be used by the STA when interacting with the network. Table 2 shows an example of a new element.

TABLE 2

| Element | Element ID | Element ID Extension | Extensible | Fragmentable |
|---|---|---|---|---|
| MAC Address Assignment Protocol Element ID | 255 (example) | <ANA> (example) | Yes | No |

Figure 3:
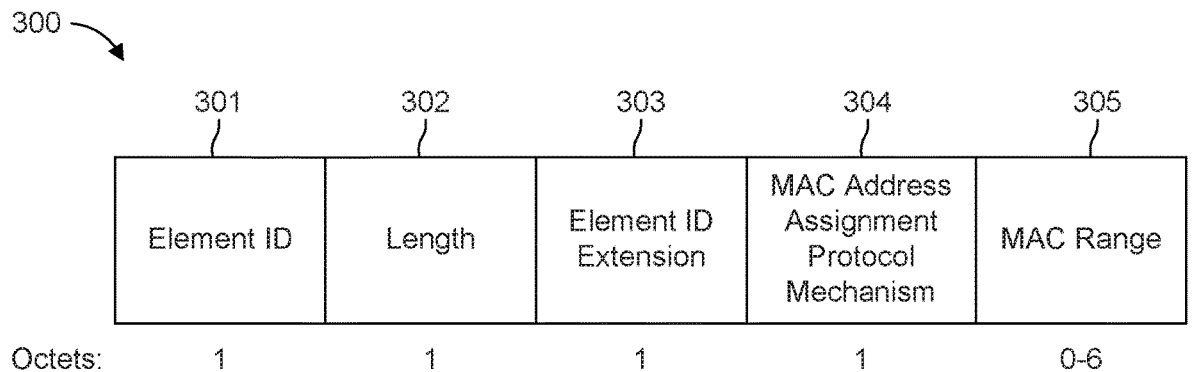
FIG. 3 shows an example of a MAC Address Assignment Protocol Element ID.

FIG. 3 shows an example MAC Address Assignment Protocol Element ID 300 based on Table 2. The MAC Address Assignment Protocol Element ID 300 may include a byte Element ID identifying the element 301, a byte defining the length 302, a bit defining if the Element ID is defined as an extension 303 (i.e., the maximum number of Element IDs have already been reached), a MAC Address Assignment Protocol Mechanism field 304 and a MAC range field 305.

The MAC Address Assignment Protocol Mechanism field 304 may correspond with an 8 bit bitmap indicating the different MAC Address Assignment Protocol mechanisms that may be used. Table 3 provides an example of such a field.

TABLE 3

| MAC Address Assignment Protocol Mechanism ID | Description |
| --- | --- |
| Bit 0 (MSB) | ELI addresses supported |
| Bit 1 | SAI addresses supported |
| Bit 2 | AAI addresses supported |
| Bit 3 | Reserved |
| Bit 4 | EUI address supported |
| Bit 5 | MAC Address Assignment Protocol Self-Assignment |
| Bit 6 | MAC Address Assignment Protocol Server available |
| Bit 7 | Reserved |

The bitmap values provided in Table 3 may enable the indication to the STAs of the different and simultaneous MAC address types that are supported in the network.

Bits 1,2, 3 and 4 may indicate that ELI, SAI and AAI addresses are supported in the network. These addresses may be provided by the MAC Address Assignment Protocol server communication or by an administrator through another mechanism.

Bit 4 may indicate that EUI-based addresses are allowed in the network.

Bit 5 may indicate that a MAC Address Assignment Protocol Self-Assignment mechanism is supported by the network. The Self-Assignment mechanism may comprise randomly assigning bits to complete 48 bits out of a MAC range defined in IEEE 802.1CQ or completing 48 bits out of the MAC prefix range provided optionally in the MAC Range field.

Bit 6 may indicate that a MAC Address Assignment Protocol server is available in the network. A protocol to talk to the MAC Address Assignment Protocol server is defined in IEEE 802.1CQ. This protocol enables the STA to obtain a MAC address belonging to the ELI, SAI, AAI or Reserved quadrants, depending on the administrator configuration. MAC address Self-Assignment with a different prefix than the one defined in IEEE 802.1CQ or within a specific random number of bits may also supported.

The behavior of the STA upon receiving a MAC Address Assignment Protocol Information ANQP Element is described herein.

In embodiments, a STA receiving the MAC Address Assignment Protocol Information ANQP element may configure a MAC address following the policy defined in the MAC Address Assignment Protocol Information ANQP element. If the STA has a pre-allocated address for this domain that is allowed by the MAC Address Assignment Protocol Information ANQP Element, the STA may use the pre-allocated address.

In embodiments where Self-Assignment is signaled (bit 5 is 1), the STA may assign a MAC address by extending the MAC range provided in the MAC Range Field to 48 bits and randomly assigning the not defined bits. The MAC range provided may fall within the AAI, SAI or ELI spaces. As such, random assignment may be done independently of the quadrant where the MAC range falls. Therefore, ELI and AAI addresses may be formed using this mechanism.

In embodiments where Self-Assignment is supported (bit 5 is 1) and a MAC range is not given, the STA may follow the Self-Assignment mechanism defined in IEEE 802.1CQ.

In embodiments where of MAC Address Assignment Protocol server availability is signaled (bit 6 is 1), the STA may start a MAC Address Assignment Protocol exchange with a MAC Address Assignment Protocol Proxy/Server, as defined in IEEE 802.1CQ, to obtain a valid local MAC address in the network. This exchange may result in an allocation of a random address in a MAC range different from the one given in the MAC Range field.

In embodiments where both Self-Assignment and MAC Address Assignment Protocol Server assignment are signaled (bits 5 and 6 are 1), the STA may choose between addressing the MAC Address Assignment Protocol Server and Self-Assigning an address. This decision may be made based on the kind of address the MAC range belongs to or the necessitating of an intervention of a MAC Address Assignment Protocol Server in the case of a terminal willing to obtain an ELI or AAI address.

In another example, Service Hint and Service Hash (exchanged in the Beacon and Probe response messages) to advertise new services related to IEEE 802.1CQ may be used to discover the service without adding additional bits.

New Service Names for the MAC Address Assignment Protocol mechanisms may be specified. The Service Names may follow the RFC 6335 and may be registered with the Internet Assigned Numbers Authority (IANA). For example, IEEE 802.1CQ may comprise the following Service Names: Ieee-8021cq-MAC Address Assignment Protocol -server; Ieee-8021cq-Self-Assignment; Ieee-8021cq-Self-Assignment-with-prefix; and Ieee-8021cq-MAC Address Assignment Protocol-server optional.

Service Names may be used within the Service Hint and Service Hash so that a STA may identify the type of MAC addresses available in the network and what kind of MAC Address Assignment Protocol mechanisms may be used.

The mechanism to build the Service Hash or Service Hint for the above defined Service Names may be the same as the mechanism specified in IEEE 802.11aq.

Service Hint and Service Hash, together or separately, may be included in Beacon, Probe response messages, DMG Beacons and Announcement frames.

Once a Service Hint or Service Hash is received by the STA, the STA can compute the Service Hint or Service Hash for a specific Service Name. If the STA computes a Service Hash or Service Hint that matches the one received, then the STA knows which service is provided and can proceed to discover information relevant to the service, such as what is the pool of addresses to be used for Self-Assignment or how to contact directly with the MAC Address Assignment Protocol Server.

In alternative embodiments, one or more types of MAC addresses supported by the network are discovered through ANQP. In these embodiments, ANQP query and response elements are extended to include the MAC Address Assignment Protocol information. Accordingly, the list of possible ANQP element definitions may be updated to include MAC Address Assignment Protocol information, as shown in Table 4.

TABLE 4

| ANQP-element name | Info ID |
| --- | --- |
| MAC Address Assignment Protocol information | <ANA> |

Figure 4:
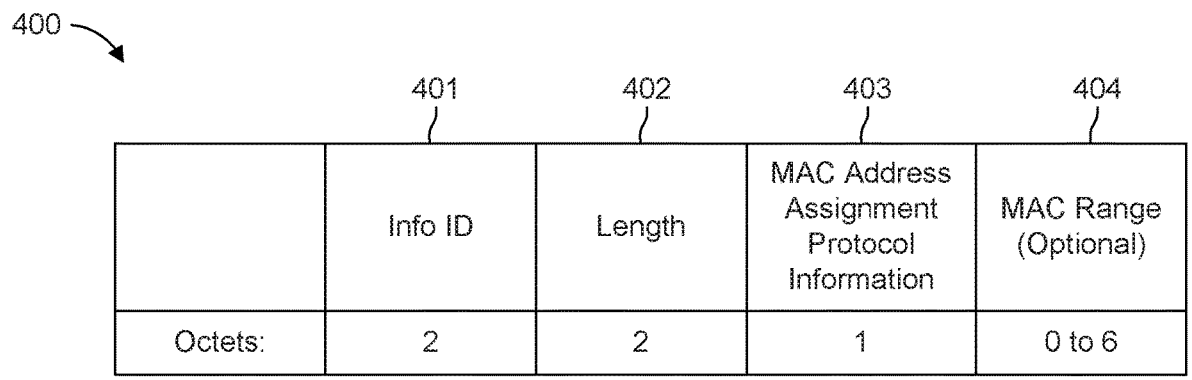
FIG. 4 shows an example of a MAC Address Assignment Protocol Information ANQP Element.

FIG. 4 shows an example of a MAC Address Assignment Protocol Information ANQP Element 400. The MAC Address Assignment Protocol Information ANQP Element 400 may include an Information ID field 401, a Length field 402, a MAC Address Assignment Protocol Information field 403, and an optional MAC Range field 404. The MAC Address Assignment Protocol Information field 403 may correspond with an 8 bit bitmap indicating the different MAC address types that are supported in the network. An example 8 bit bitmap indicating the different MAC address types that may be used is shown in Table 5.

TABLE 5

| MAC Address Assignment Protocol Information (Bitmap) | Description |
| --- | --- |
| Bit 0 (MSB) | ELI addresses supported |
| Bit 1 | SAI addresses supported |
| Bit 2 | AAI addresses supported |
| Bit 3 | Reserved |
| Bit 4 | EUI Addresses supported |
| Bit 5 | MAC Address Assignment Protocol Self-Assignment |
| Bit 6 | MAC Address Assignment Protocol Server available |
| Bit 7 | Reserved |

The bitmap values provided in the Table 5 may enable indication to the STAs of the different and simultaneous MAC address types that are supported in the network.

Bits 1,2, 3 and 4 may respectively indicate that ELI, SAI and AAI addresses are supported in the network. These addresses may be provided by the MAC Address Assignment Protocol server communication or provided by an administrator through another mechanism.

Bit 4 may indicate EUI-based addresses are allowed in the network.

Bit 5 may indicate that MAC Address Assignment Protocol Self-Assignment mechanism is supported by the network. MAC Address Assignment Protocol Self-Assignment may comprise randomly assigning bits to complete 48 bits out of a MAC range defined in IEEE 802.1CQ. Additionally or alternatively, MAC Address Assignment Protocol Self-Assignment may comprise completing 48 bits out of the MAC prefix range provided optionally in the MAC Range field.

Bit 6 may indicate that a MAC Address Assignment Protocol server is available in the network. A protocol to talk to the MAC Address Assignment Protocol server is defined in IEEE 802.1CQ. This protocol may enable the STA to obtain a MAC address belonging to the ELI, SAI, AAI or Reserved quadrants, depending on the administrator configuration. MAC address Self-Assignment with a different prefix than the one defined in IEEE 802.1CQ or within a specific random number of bits may also be supported.

The behavior of the STA upon receiving a MAC Address Assignment Protocol Information ANQP Element is described herein.

In embodiments, the STA receiving the MAC Address Assignment Protocol Information ANQP Element may configure a MAC address based on the policy defined in the MAC Address Assignment Protocol Information ANQP Element. If the STA has a pre-allocated address for this domain that is allowed by the MAC Address Assignment Protocol Information ANQP Element, the STA may use the address.

In embodiments where Self-Assignment is signaled (bit 5 is 1), the STA may proceed to assign a MAC address by extending to 48 bits the MAC range provided in MAC Range Field and randomly assigning the not defined bits. The MAC range provided may fall within the AAI, SAI or ELI spaces. Therefore, random assignment may be done independent of the quadrant where the MAC range falls. As such, the ELI and AAI addresses may be formed using this mechanism.

In other embodiments where Self-Assignment is signaled (bit 5 is 1), a MAC range may not be given. In these embodiments, the STA may follow the Self-Assignment mechanism defined in IEEE 802.1CQ.

In embodiments where a MAC Address Assignment Protocol Server assigned address is signaled (bit 6 is 1), the STA may start a MAC Address Assignment Protocol exchange with a MAC Address Assignment Protocol Proxy/Server as defined in IEEE 802.1CQ to obtain a valid local MAC address in the network. This exchange may result in an allocation of a random address in a MAC range different from the one given in the MAC Range field.

In embodiments where both Self-Assignment and MAC Address Assignment are signaled (bits 5 and 6 are 1), the STA may choose between addressing the MAC Address Assignment Protocol server or self-assigning an address. This decision may be made based on the kind of address the MAC range belongs to. In embodiments where a terminal is willing to obtain an ELI or MI address, the STA may choose to address the MAC Address Assignment Protocol server. Mechanisms to reach a MAC Address Assignment Protocol Proxy/Server, through the WLAN AP in PAD are described herein. An example method addresses how, when once a MAC address type is discovered, a mobile device in PAD may interact with the MAC Address Assignment Protocol service to acquire or rebind a MAC address via IEEE 802.1CQ methods.

In embodiments, one of the features introduced in the advertisement mechanisms of IEEE 802.11 is the use of ANQP to reach a Service Information Registry to obtain a service or information before the actual association by the STA to the network. In further embodiments, PAD may specify two ANQP Elements: (1) Service Information Request ANQP-Element and (2) Service Information Response ANQP-Element.

The Service Information Request ANQP Element may contain a generic request for service information associated with the one or more service hashes provided. For example, in IEEE 802.1CQ, MAC Address Assignment Protocol, the STA may use the Hash of the Service Names. In another example, Service Hint and Service Hash (exchanged in the Beacon and Probe response messages) to advertise new services related to IEEE 802.1CQ.

Figure 5:
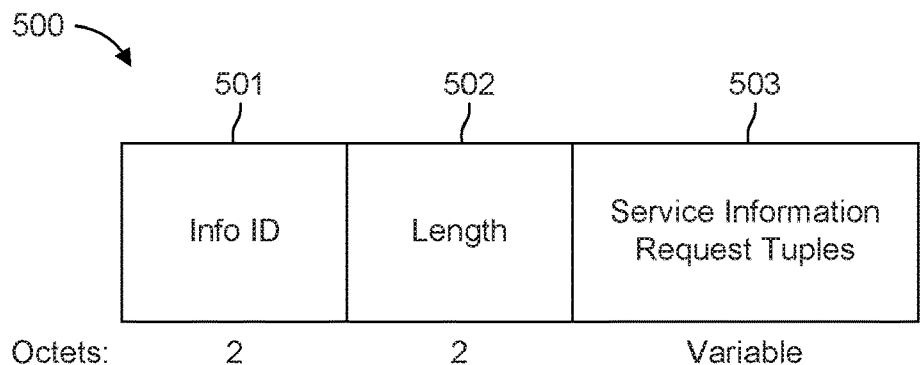
FIG. 5 shows an example of a format of the Service Information Request ANQP-element.

FIG. 5 shows an example of a possible format of the Service Information Request ANQP Element 500. The Service Information Request ANQP Element 500 may include an information ID field 501, a Length field 502, and a Service Information Request Tuple field 503. The Service Information Request Tuples field 503 may contain one or more Service Information Request Tuple subfields.

Figure 6:
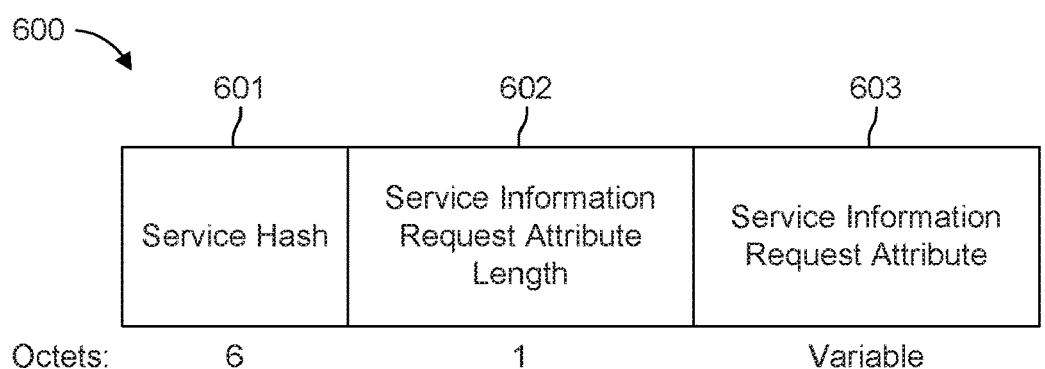
FIG. 6 shows an example of a format of the Service Information Request Tuple subfield.

FIG. 6 shows an example of a format of the Service Information Request Tuple subfield 600. The Service Information Request Tuple subfield 600 may include a Service Hash field 601, a Service Information Request Attribute Length field 602, and a Service Information Request Attribute subfield 603.

In embodiments, The Service Information Request Attribute subfield may contain a service-specific query. For example, for IEEE 802.1CQ, it may contain the specific query to the MAC Address Assignment Protocol server in order to obtain a MAC address. Note that although the IEEE 802.11aq mechanism is stateless, multiple GAS messages may be exchanged as part of a single MAC Address Assignment Protocol transaction.

In embodiments, the Service Information Response Attribute may have a similar format, with a main difference being the allowable size for the response.

Examples of protocol messages which enable the request and delegation of MAC addresses within the wireless domain using the ANQP Service Information Request are described. When a request reaches the AP, if a MAC Address Assignment Protocol Proxy/Server is implemented in the AP, the AP may reply directly to the terminal. If the AP does not have any MAC Address Assignment Protocol functionality, it may generate a DHCP request, receive a response and answer based on the response to the terminal.

An example MAC Address Assignment Protocol Service Information Request/Response Attribute is described. The MAC Address Assignment Protocol Service Information Request/Response Attribute may be based on TLV representation. It may support three defined operations: (1) Request of a MAC address assignment, (2) Rebind of a MAC address and (3) Delegation of a MAC Address.

Figure 7:
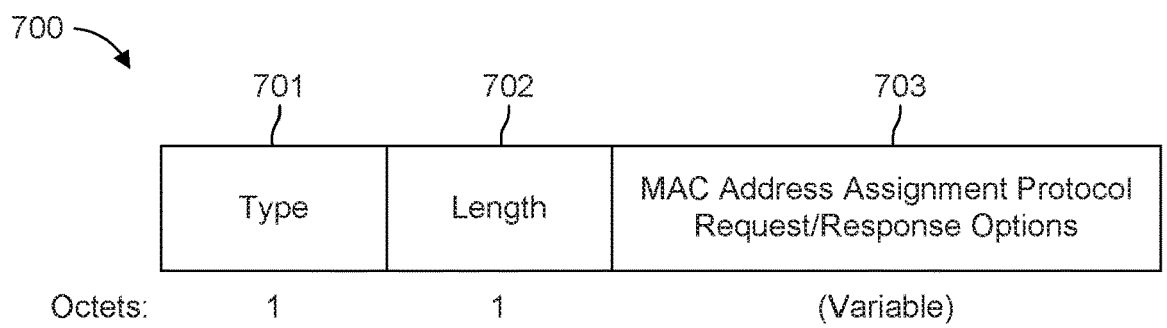
FIG. 7 shows an example of a format for a MAC Address Assignment Protocol Information Request field.

FIG. 7 shows an example format for a MAC Address Assignment Protocol Service Information Request field 700. A MAC Address Assignment Protocol Service Information Request Field 700 may include a Type field 701 defining the type, a Length Field 702, and a MAC Address Assignment Protocol Request/Response Options field 703. Table 6 shows possible definitions for the Type Field 701.

TABLE 6

| Value | Description |
| --- | --- |
| 0 | Request |
| 1 | Rebind |
| 2 | Response |
| 3-255 | Reserved |

The Length field 702 may indicate the length of the MAC Address Assignment Protocol Request/Response Options field. In the MAC Address Assignment Protocol Request/Response Options field 703, the protocol may support the transport of different information between the STA and the MAC Address Assignment Protocol Proxy/Server. In embodiments, the Request/Response options may comprise: (1) the DUID Option, and (2) the IAID Option.

Figure 8:
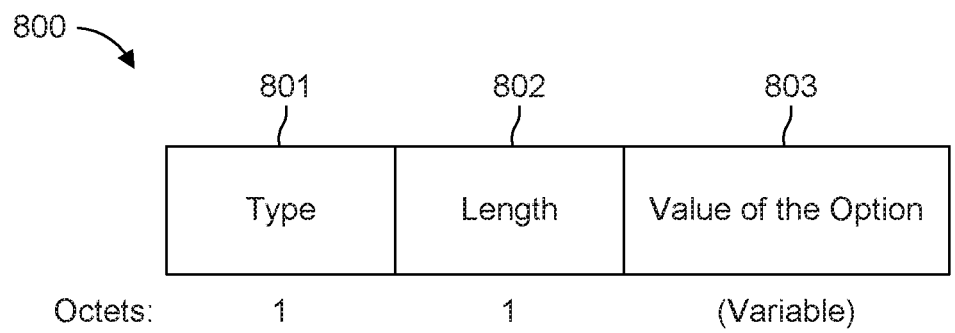
FIG. 8 shows an example of a MAC Address Assignment Protocol Request/Response format.

FIG. 8 shows an example of the MAC Address Assignment Protocol Request/Response Options 800. The MAC Address Assignment Protocol Request/Response Options 800 may include a Type field 801, a Length field 802, and a Value of the Option field 803. The Type field may indicate the kind of action, based on Table 7.

TABLE 7

| Value | Description |
| --- | --- |
| 0 | DUID Option |
| 1 | IAID Option |
| 2-255 | Reserved |

The DUID option may enable an STA to communicate its DHCP Unique Identifier. This ID may identify the STA for DHCP purposes and may be used to establish a binding between the STA and a DHCP server providing a MAC assignment.

The DUID option may have a maximum size of 128 bytes. The DUID option may comprise one of the following types: (1) Link-layer address plus time; (2) Vendor-assigned unique ID based on Enterprise Number; and (3) Link-layer address.

The IAID option may enable an STA to communicate the Identity Association to be used for the MAC assignment.

Figure 9:
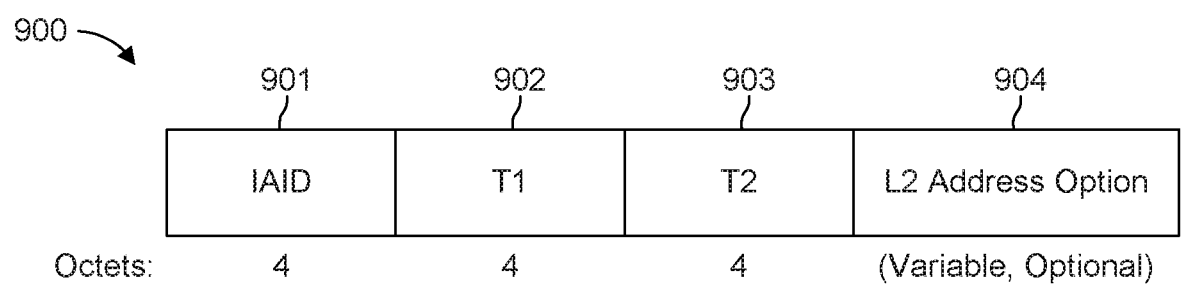
FIG. 9 shows an example of a format for an IAID option.

FIG. 9 shows an example of a possible format of the IAID option 900. The IAID option 900 may include an IAID field 901 as defined in RFC3315, identified in the L2 address IA; a T1 field 902, where T1 is the time at which a client contacts the server from which the addresses in the IA were obtained to extend their lifetimes, where T1 is a time duration relative to the current time expressed in units of seconds; and a T2 field, where T2 is the time at which the client contacts any available server to extend the lifetimes of the addresses assigned to the IA, where T2 is a time duration relative to the current time expressed in units of seconds.

In embodiments where the IAID option 900 is added to a Service Information Response Attribute, the IAID option 900 may also carry a L2 Address Option 904 from the MAC Address Assignment Protocol Proxy/Server to the client.

FIG. 10 is an example of a possible format for an L2 Address Option 1000. The L2 Address Option 1000 may include an Preferred Lifetime field 1001, a Valid Lifetime field 1002, and a MAC Addresses field 1003. The Preferred Lifetime field 1001 indicates the time after the address is bound to an interface and deprecating, but still valid. The Valid Lifetime field 1002 indicates the time after which the address will be unbounded from the interface and no longer valid. In embodiments, all MAC addresses included in the IAID option are 48 bits long.

Figure 11:
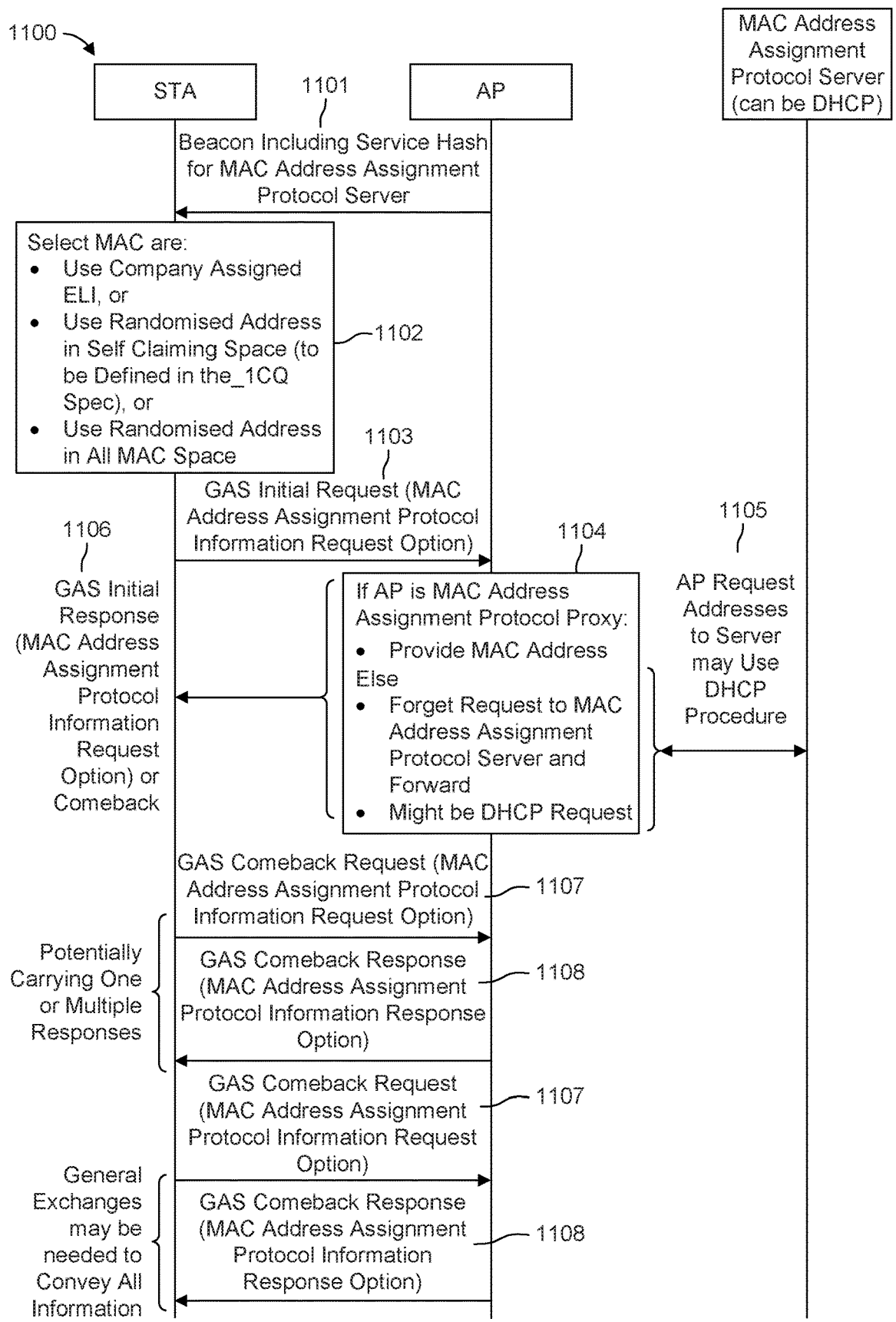
FIG. 11 shows an example end-to-end interaction between STA, AP, and MAC Address Assignment Protocol Server from initial pre-association discovery (PAD) to MAC address assignment.

FIG. 11 shows an example end-to-end interaction 1100 between the STA (device), the AP, and the MAC Address Assignment Protocol server from initial PAD to MAC address assignment.

In the end-to-end interaction 1100, the AP may transmit to the STA a Beacon 1101 including a Service Hash or Service Hint for the MAC Address Assignment Protocol Server. The Beacon may indicate to the STA the MAC address types that are supported in the network or may indicate the existence of an ANQP Information Element as described above. For example, the Beacon may indicate that: (1) ELI addresses are supported in the network; (2) a MAC Address Assignment Protocol Self-Assignment mechanism is supported by the network; and (3) a MAC Address Assignment Protocol server is available in the network. As such, the MAC Address selection 1102 may be based on (1) a company assigned ELI; (2) a MAC Address Assignment Protocol Self-Assignment defined in IEEE 802.1CQ; or (3) a MAC Address Assignment Protocol server assigned address. The STA may then transmit a GAS Initial Request (MAC Address Assignment Protocol Service Information Request Option) 1103 to the AP. The AP may then transmit a GAS Initial Response (MAC Address Assignment Protocol Service Information Request Option) or Comeback 1106 to the STA. If a MAC Address Assignment Protocol Proxy/Server is implemented in the AP 1104, the AP may provide the MAC address. If a MAC Address Assignment Protocol Proxy/Server is not implemented in the AP 1104, the AP may forward the request 1105 to the a MAC Address Assignment Protocol Proxy/Server. The request 1105 may be a DHCP request. The STA may then transmit a GAS Comeback Request (a MAC Address Assignment Protocol Proxy/Server Service Information Request Option) 1107 to the AP. The AP then transmits a GAS Comeback Response (a MAC Address Assignment Protocol Proxy/Server Service Information Request Option) 1108. The GAS Comeback Request 1107 and GAS Comeback Response 1108 may carry one or multiple responses. Several exchanges between the STA and the AP may be needed to convey all of the information and finally assign a MAC address. After the GAS Comeback Request 1107 and GAS Comeback Response 1108 exchange, the STA obtains a MAC address.

In the example end-to-end procedure 1100, there is no authentication between the STA and the AP. As such, the procedure shown in FIG. 11 may be used in embodiments where authentication is not needed or not possible. For example, the procedure of FIG. 11 may be useful in embodiments in which the STA can choose from a prefix of MAC addresses that are distributed.

Establishing mutual authentication between the STA and the AP is described herein. In some cases, the lack of an authentication mechanism between the STA requesting the address and the AP which will associate the STA may be problematic. For example, there may be no way of assessing the identity of the STA that tries to associate with a given MAC address to a given AP. Further, after getting a MAC address via the mechanism defined above, it may be possible for there to be an attacker that impersonates the AP, since there is no mechanism in place to authenticate the AP as the one used to access the a MAC Address Assignment Protocol Proxy/Server.

A mechanism that can be used for mutual authentication is described herein. The mechanism may assume a shared secret has been obtained between the AP and the STA. This shared secret may be obtained by one of the following mechanisms: (1) a cryptographic mechanism for the derivation of shared secrets between peers without previous contact, such as Diffie-Hellman; (2) the use of IEEE 802.1AR (Secure Device ID); or (3) the use of public/private keys, preinstalled in the devices.

In embodiments, the IEEE 802.11 Authentication request and response frames may be modified to support the exchange of a token that can be used to authenticate. Table 8 shows two fields that may be included in the Bodies of the Authentication Request and Response frames.

TABLE 8

| Order | Information | Notes |
|---|---|---|
| 1 | Authentication algorithm number | |
| 2 | Authentication transaction sequence number | |
| 3 | Status code | The status code information is reserved in certain Authentication frames as defined in Table 9-36. |
| 4 | Challenge text | A Challenge Text element is present only in certain Authentication frames as defined in Table 9-36. |
| 5 | RSN | An RSNE is present only in certain Authentication frames as defined in Table 9-36. |
| 6 | Mobility Domain | An MDE is present only in certain Authentication frames as defined in Table 9-36. |
| 7 | Fast BSS Transition | An FTE is present only in certain Authentication frames as defined in Table 9-36. |
| 8 | Timeout Interval (reassociation deadline) | A TIE containing the reassociation deadline interval is present only in certain Authentication frames as defined in Table 9-36. |
| 9 | RIC | A resource information container, containing a variable number of elements, is present only in certain Authentication frames as defined in Table 9-36. |
| 10 | Finite Cyclic Group | An unsigned integer indicating a finite cyclic group as described in 12.4.4. This is present only in certain Authentication frames as defined in Table 9-36. |
| 11 | Anti-Clogging Token | A random bit string used for anti-clogging purposes as described in 12.4.6. This is present only in certain Authentication frames as defined in Table 9-36. |
| 12 | Send-Confirm | A binary encoding of an integer used for anti-replay purposes as described in 12.4.7.5. This is present only in certain Authentication frames as defined in Table 9-36. |
| 13 | Scalar | An unsigned integer encoded as described in 12.4.7.4. This is present only in certain Authentication frames as defined in Table 9-36. |
| 14 | Finite field element | A Finite field element field from a finite field encoded as described in 12.4.7.4. This is present is present only in certain Authentication frames as defined in Table 9-36. |
| 15 | Confirm | An unsigned integer encoded as described in 12.4.7.5. This is present only in certain Authentication frames as defined in Table 9-36. |
| 16 | Multi-band | The Multi-band element is optionally present if dot11MultibandImplemented is true. |
| 17 | Neighbor Report | One or more Neighbor Report elements are present only in certain Authentication frames as defined in Table 9-36. |
| <ANA> | MAC Address Assignment Protocol Challenge Text | One MAC Address Assignment Protocol Challenge Text can be present in any Authentication Frame with any transaction sequence number. |
| <ANA+1> | MAC Address Assignment Protocol Scalar | One MAC Address Assignment Protocol Scalar can be present in any Authentication Frame with any transaction sequence number. |
| <ANA+2> | MAC Address Assignment Protocol Request to assign address | Field indicating the request from the STA to be assigned with a MAC address. Can be present in authentication frames with transaction sequence number 1 and 3. |
| <ANA+3> | MAC Address Assignment Protocol Assigned MAC address | A MAC address to be assigned to the STA. Can be present in any Authentication Frame with any transaction sequence number. |
| Last | Vendor Specific | One or more vendor-specific elements are optionally present. These elements follow all other elements. |

Figure 12:
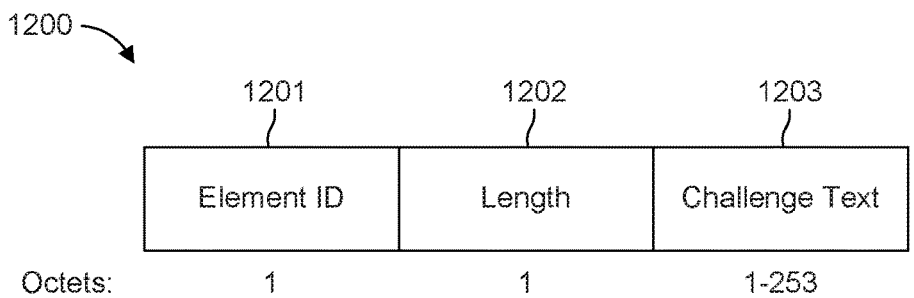
FIG. 12 shows an example of a MAC Address Assignment Protocol Challenge Text Element ID.

FIG. 12 shows an example MAC Address Assignment Protocol Challenge Text Element ID 1200. The MAC Address Assignment Protocol Challenge Text Element ID 1200 may include an Element ID field 1201, a Length field 1202, and a Challenge Text Field 1203. The MAC Address Assignment Protocol Challenge Text field 1203 may hold Challenge Text which will be cyphered with the shared secret generated in the MAC Address Assignment Protocol message exchange.

The MAC Address Assignment Protocol Scalar may correspond to variable length Non Element field, implemented as a single use random number that is added to the Challenge Text before cyphering. This field may be used to protect replay attacks.

The MAC Address Assignment Protocol Request to assign address, implemented as a Non Element field, may contain a 1 octet number indicating with a 1 if assignment of MAC address is requested, or a 0 if not. If the assignment of MAC address is not requested (i.e., the 1 octet number is 0), the AP may still send a MAC Address Assignment Protocol Assigned MAC address field to force the STA implementing IEEE 802.1CQ to configure an address.

The MAC Address Assignment Protocol Assigned MAC Address may be a 48 bits MAC address to be assigned to the STA. It may be implemented as an Element ID, containing Element ID, Length and a 48 bits MAC address or as a Non Element field.

The operation of the authentication mechanism as described rely on the MAC Address Assignment Protocol client in the STA and the MAC Address Assignment Protocol Proxy/Server having already established a shared secret that may be used for authentication. After the GAS exchange, the STA state may include a candidate MAC address and a shared secret. The MAC Address Assignment Protocol client at the STA and MAC Address Assignment Protocol Proxy/Server at the AP may interact with the SME layer of IEEE 802.11 and setup the key information needed to verify the shared secret. The IEEE 802.11 may have specified several authentication mechanisms, including Open Authentication, Shared Secret, Fast BSS Transition and Shared Authentication among Equals (SAE). The authentication mechanism described may work on top of all the IEEE 802.11 mechanisms by adding new fields to the Authorization Request and Response frames.

Figure 13:
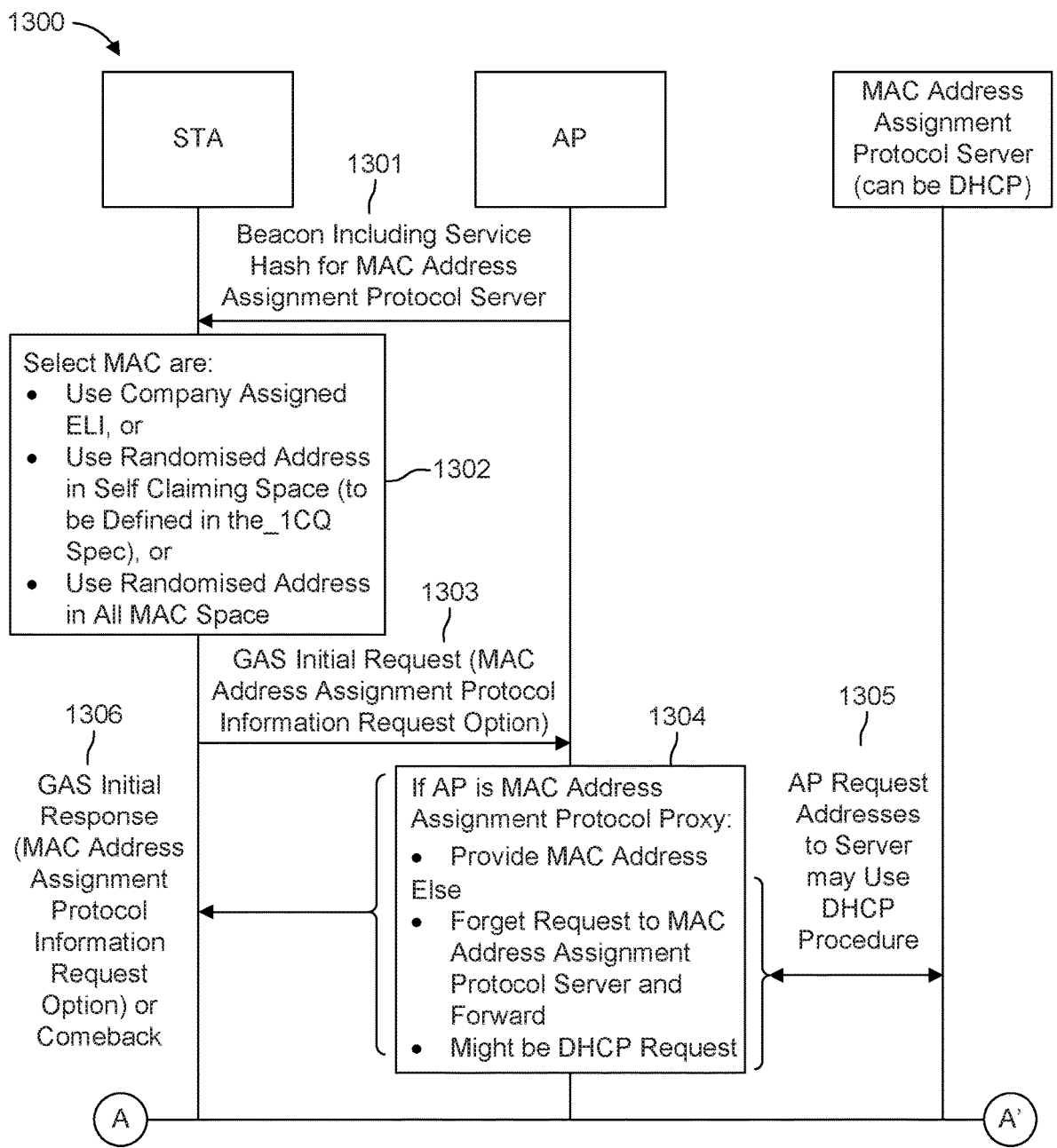
FIG. 13 shows an example of authentication extensions.
Figure 13:
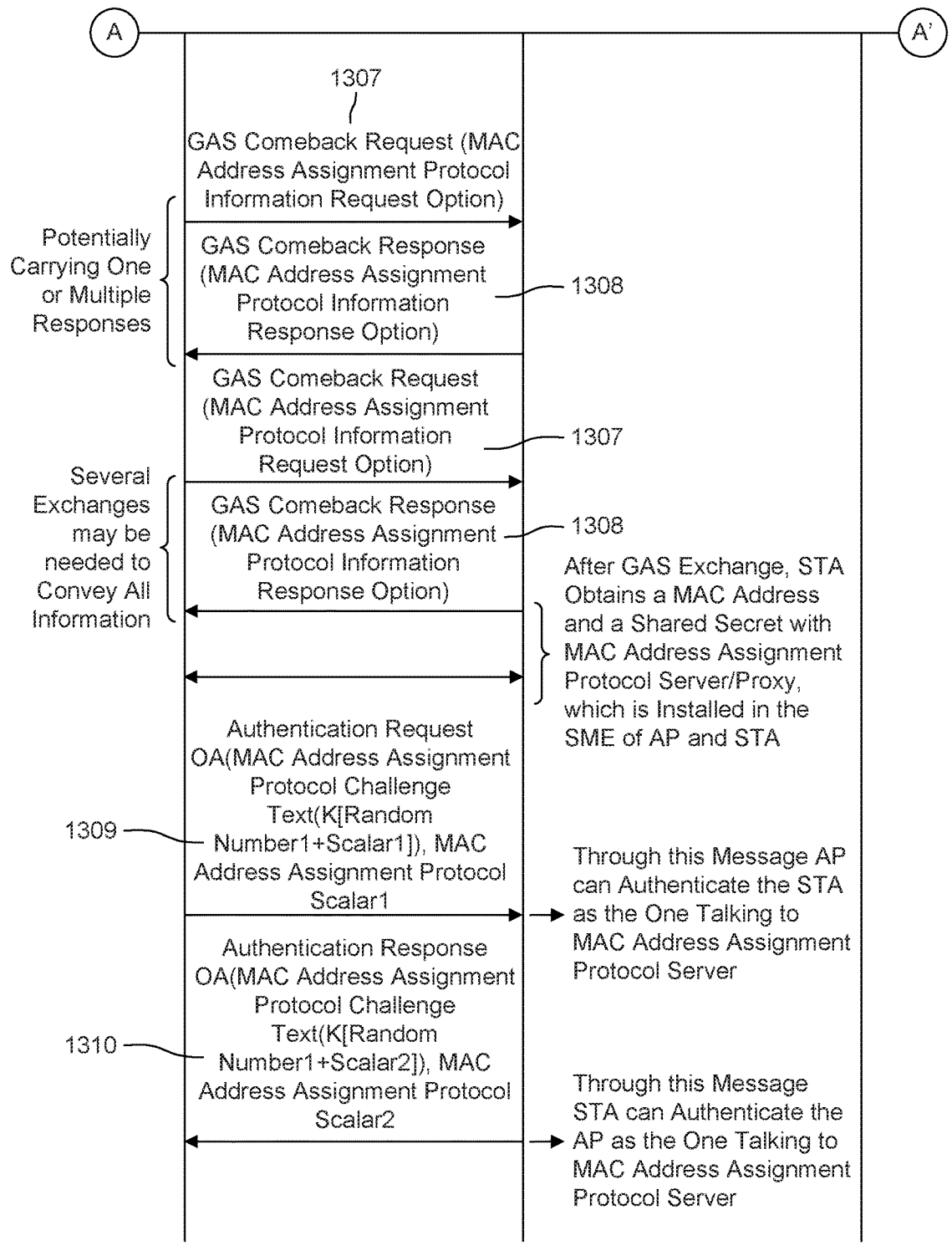

FIG. 13 shows an example end-to-end interaction 1300 with authentication extensions. The first steps of the procedure (1301-1308) are similar to those of FIG. 11 (1101-1108) and will not be discussed in detail here. After the GAS Comeback Request 1307 and GAS Comeback Response 1308 exchange, the STA obtains a MAC address, as well as a shared secret with MAC Address Assignment Protocol Server, which is installed in the SME of the AP and STA. The shared secret may be used to cypher information between the AP and the STA.

In the procedure shown in FIG. 13, Open Authentication is assumed, although the mechanism may apply to all of the IEEE 802.11-2016 defined mechanisms. The STA may transmit an Authentication Request frame 1309 to the AP. In the Authentication Request frame, the STA may include a MAC Address Assignment Protocol Challenge Text formed based on the cyphering with the shared secret of a Random Number (Random Number 1) added to a random number (Scalar 1). The frame will also include a MAC Address Assignment Protocol Scalar containing Scalar 1.

Upon reception, the AP must be able to extract Random Number 1, proving the identity of the STA. The AP may then transmit an Authentication Response 1310 to the STA. The Authentication Response may include another MAC Address Assignment Protocol Challenge Text formed based on the cyphering with the shared secret of Random Number 1 added to a second random number (Scalar 2). The frame may also include a MAC Address Assignment Protocol Scalar containing Scalar 2.

Upon reception, the STA may be able to extract Random Number 1, authenticating the AP and hence proving that the same MAC Address Assignment Protocol Proxy/Server is serving the AP. Scalar 1 and Scalar 2 may be single use numbers to protect the MAC Address Assignment Protocol Proxy/Server from replay attacks.

Globally unique MAC addresses are assigned to most IEEE 802 end stations and bridge ports. Increasing use of virtual machines and Internet of Things (IoT) devices may exhaust the global MAC address space if global MAC addresses are assigned. These applications could use the local MAC address space, but some applications require independent address administration (e.g. virtualization systems and protocol specific address mappings). For example, the IEEE 802c project provides conventions and enable protocols that will allow multiple stations or servers to automatically configure and use local MAC addresses without conflict when multiple administrations share a local address space. Such protocols may allow virtual machines and IoT devices to obtain a local MAC address without centralized local MAC address administration.

For example, IEEE 802c may provide an optional local MAC address space structure to allow multiple administrations to coexist. This structure may designate a range of local MAC addresses for protocols using a Company ID (CID) assigned by the IEEE Registration Authority. Another range of local MAC addresses may be designated for assignment by local administrators. IEEE 802c may recommend a range of local MAC addresses for use by IEEE 802 protocols.

In another example, the IEEE 802c may define the Structured Local Address Plan (SLAP). Four ranges or quadrants of local MAC addresses may be defined in the SLAP: (1) Extended Local Identifier (ELI); (2) Standard Assigned Identifier (SAD; (3) Administratively Assigned Identifier (AAI); and (4) Reserved. Each quadrant may be defined in base of 4 bits of the MAC address. The least and second least significant bits of the initial octet of a MAC address may be designated the M bit and X bit, respectively. The X bit may also be referred to as the Universal/Local (U/L) bit, which identifies how the address is administered. For example, if the bit is 0, the address is universally administered, and if the bit is 1, the address is locally administered. The M bit indicates if the address is unicast (0) or multicast/broadcast (1). The third and fourth least significant bits of the initial octet in the local MAC address may be designated the Y bit and Z bit, respectively, as illustrated for a 48-bit address in FIG. 14.

Figures 14, 15:
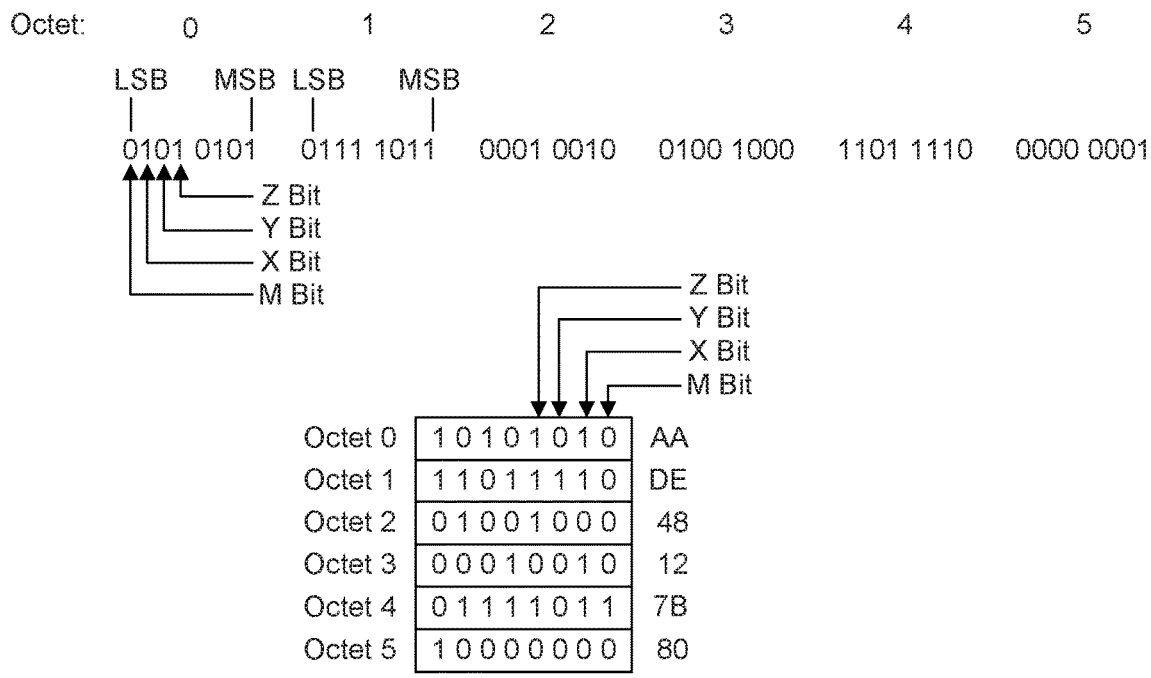
FIG. 14 shows an example M, X, Y and Z bit allocation of local MAC address format.
FIG. 15 shows an example of Structured Local Address Plan (SLAP) local identifier types.

FIG. 14 shows an example of M, X, Y and Z bit allocation of a local MAC address format 1400.

FIG. 15 shows examples of the SLAP local identifier types 1500. A local address may exist in one of four SLAP quadrants 1501, each identified by a different combination of Y bits 1502 and Z bits 1503, as indicated in FIG. 15. FIG. 15 also indicates the SLAP local identifier type 1504 and SLAP local identifier 1505 specified for each SLAP quadrant.

A SLAP identifier of type "Extended Local" is known as an Extended Local Identifier (ELI). ELIs may be located in SLAP Quadrant 01. The X, Y, and Z bits of an ELI may be 1,0,1 respectively. An ELI may be used as local MAC address (an "ELI address").

The IEEE Registration Authority (RA) may uniquely assign a 24-bit identifier known as the Company ID (CID)

1 to identify a company, organization, entity, protocol, etc., as described in "Guidelines for Use Organizationally Unique Identifier (OUI) and Company ID (CID)". An ELI is based on an assigned Company ID. Two different lengths of ELI are specified: (1) ELI-48, a 48-bit ELI, and (2) ELI-64, a 64-bit ELI.

A SLAP identifier of type "Standard Assigned" is known as a Standard Assigned Identifier (SAD. SAIs may be located in SLAP Quadrant 11. The X, Y, and Z bits of an SAI may be 1,1,1 respectively. An SAI may be used as local MAC address (an "SAI address"). Specification of the use of the SAI quadrant for SLAP address assignments may be reserved for IEEE 802.1CQ Standard.

A SLAP identifier of type "Administratively Assigned" may be known as an Administratively Assigned Identifier (AAI). AAIs may be in SLAP Quadrant 00. The X, Y, and Z bits of an SAI may be 1,0,0 respectively. An AAI may be used as local MAC address (an "AAI address"). Administrators who wish to assign local MAC addresses in an arbitrary fashion (e.g., randomly) and yet maintain compatibility with other assignment protocols operating under the SLAP on the same LAN may assign a local MAC address as AAI.

PAD methods are disclosed. IEEE 802.11 has acknowledged the need for a mechanism to notify stations of the services available in an IEEE 802.11 network before association with an AP. This may be needed since the procedure of association, considering security and QoS negotiation may be complex and time consuming, even more so if after association the users find that the service needed is not available. As such, the IEEE 802.11aq PAD activity may be initiated. PAD is an interworking function that may allow a STA, prior to association, to discover information concerning services that might be available to the STA when it is associated to the WLAN network, i.e., ESS. PAD may provide a mechanism by which the STA any further information to aid in the decision to select a network with which to associate. PAD may use the GAS to provide both support for a STA's network discovery and selection, and support for a conduit for communication by a non-AP STA with other information resources in a network before joining the wireless LAN.

Figure 16:
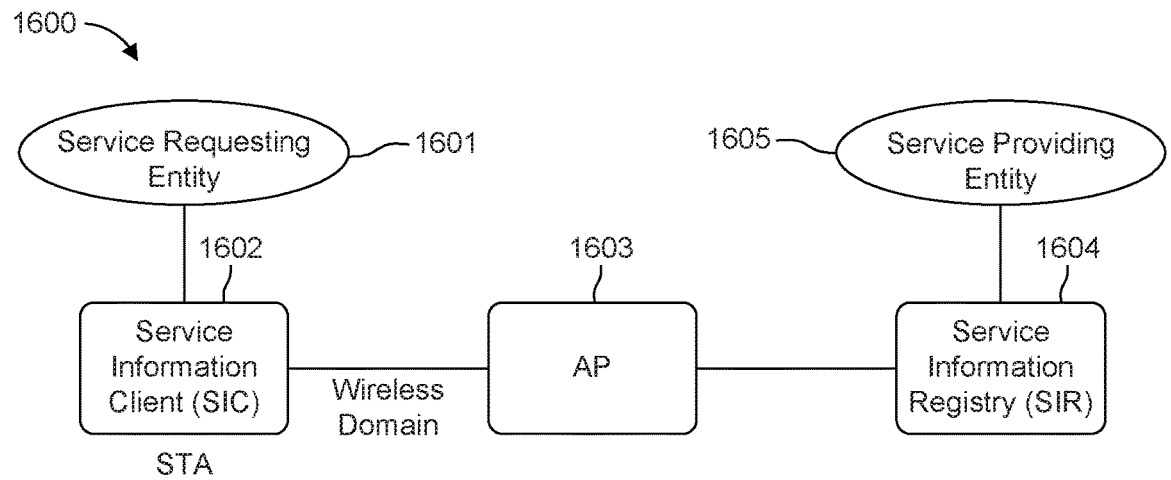
FIG. 16 shows an example PAD architecture with direct communication between the AP and the SIR.

FIG. 16 shows an example PAD architecture 1600 with direct communication between the AP and the SIR. The PAD architecture 1600 may comprise a Service Requesting Entity 1601, a SIC 1602, an AP 1603, a SIR 1604, and a Service Providing Entity 1605. The AP 1603 and the SIR 1604 may communicate directly, as indicated in FIG. 16.

Figure 17:
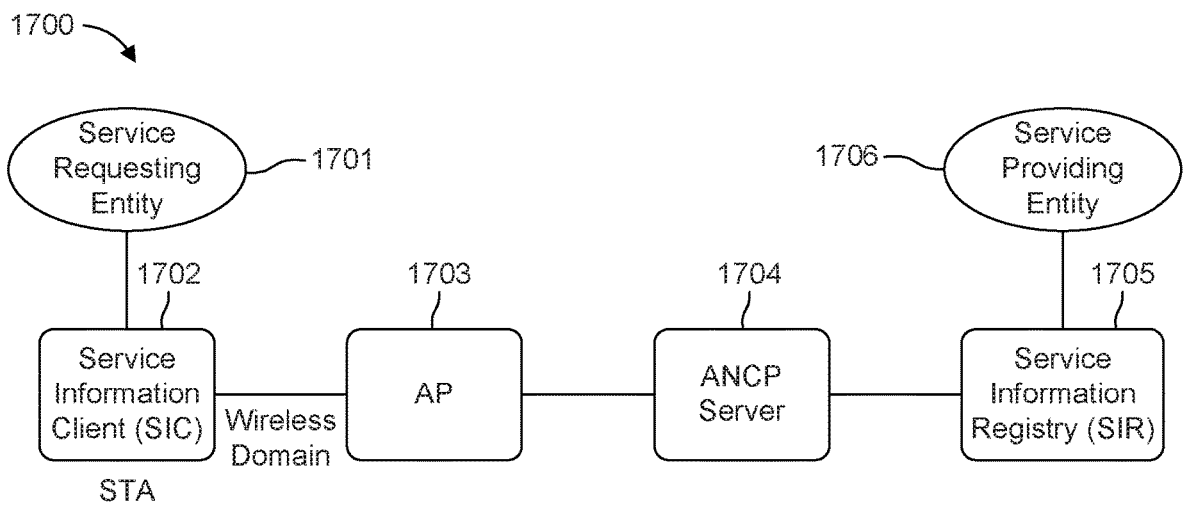
FIG. 17 shows an example PAD architecture with indirect communication with SIR through ANQP Server.

FIG. 17 shows an example PAD architecture 1700 with indirect communication with SIR through an ANQP Server. The PAD architecture 1700 may comprise a Service Requesting Entity 1701, a SIC 1702, an AP 1703, an ANQP server 1704, a SIR 1705, and a SPE 1706. The SIR 1705 may be co-located with the AP 1703 or outside the AP 1703. The communications between the SIR 1705 and the AP 1703, together with the SIR 1705 and the ANQP server 1704, are out of the scope of the PAD standard. The SIC 1702 and SIR 1705 may be used to exchange PAD service information. The PAD procedures may operate between the SIC 1702 and SIR 1705.

The SIR may cache information about services that may be reachable via the ESS, and therefore may be available to the STA once the STA is associated with that ESS. The mechanism by which the SIR obtains the information about services is outside the scope of the PAD standard. The SIC 1605 may initiate service discovery. The SIC may exchange service discovery requests and responses between the SME and applications. The SME may determine whether to use unsolicited PAD or solicited PAD procedures. The SME may also compose ANQP requests for solicited PAD procedures.

Advertisement of services through PAD is described herein. PAD may use different mechanisms for service advertisement, which may be transported in Beacons, Probe Messages or ANQP messages. The basic mechanism defined in PAD may use new parameters such as: (1) Service Hint, which may provide a probabilistic representation of a set of services that are available to the ESS; and (2) Service Hash, which may contain one or more service hashes.

The Service Hint may be formed by a bitmap which contains a bloom filter formed by combining the hash of all the services available in the ESS. Bloom filters are special hashes which have a probability of false positives. For example, the resulting bloom filter may indicate a service is available, when in fact it is not available.

The Service Hash may be the result of applying a SHA-256 hash function to the name of a service. The name of the service may be defined following RFC 6335. These two elements may be included in the advertising information sent by all APs of the ESS. Therefore, a STA may be able to understand the list of services available, as long as it knows the names of the services. The main difference between the Service Hit and the Service Hash may be that there will be a single Service Hint field for all services advertised, while there may be one Service Hash element per Service advertised.

In embodiments, once the STA understands if a given service may be available, it may query the AP for the specific service, or it may try to communicate with the service provider directly through the GAS protocol. In further embodiments, the STA may try to communicate with the service provider through ANQP.

The GAS defined in IEEE 802.11 provides transport mechanisms for advertisement services while STAs are in the unassociated state as well as the associated state. The GAS may transport multiple advertisement protocols such ANQP, MIH, EAS, RLQP, etc. If the GAS is implemented, ANQP must also be supported. The GAS protocol may be a query and response simple protocol.

Figure 18:
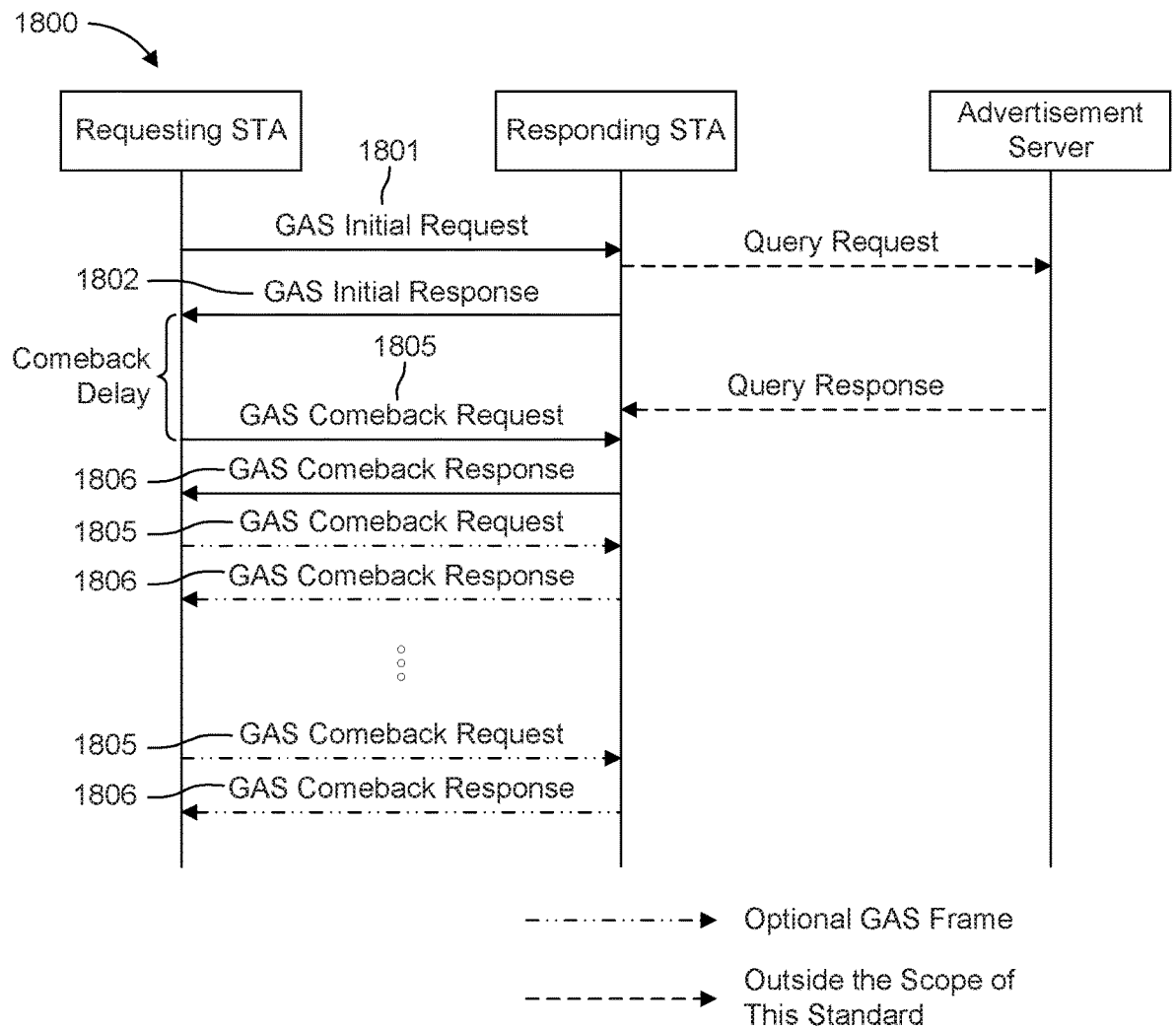
FIG. 18 shows an example flow diagram of Generic Advertisement Protocol (GAS).

FIG. 18 is an example flow diagram of the GAS protocol 1800. A Requesting STA may transmit a GAS Initial Request 1801 to a Responding STA. The GAS Initial Request may contain information on the advertisement protocol to be used and other fields to start the conversation such as a Dialogue Token. The Responding STA may relay a Query Request to the Advertisement Server, however this is outside the scope of this standard. The Responding STA may then transmit a GAS Initial Response 1802 to the Requesting STA. Once the AP confirms with the Advertisement Server that the advertisement protocol requested is available, the actual exchange of queries about the services advertised may begin. The Requesting STA may transmit a GAS Comeback Request 1805 to the Responding STA. The Responding STA may transmit a GAS Comeback Response 1806 to the Requesting STA. Several exchanges between the STA and the AP may be needed to convey all of the information. Initial queries and responses can be also added to the initial request/ responses.

ANQP is an advertisement protocol for GAS. This TLV-based advertisement protocol may allow information shown in Table 9 to be obtained from the BASS in a pre-associate state.

TABLE 9

| ANQP-element name | ANQP-element type |
| --- | --- |
| Query List | Q |
| Capability List | S |
| Venue Name | S |
| Emergency Call Number | S |
| Network Authentication Type | S |
| Roaming Consortium | S |
| Vendor Specific | Q, S |
| IP Address Type Availability | S |
| NAI Realm | S |
| 3GPP Cellular Network | S |
| AP Geospatial Location | S |
| AP Civic Location | S |
| AP Location Public Identifier URI/FQDN | S |
| Domain Name | S |
| Emergency Alert Identifier URI | S |
| TDLS Capability | Q, S |
| Emergency NAI | S |
| Neighbor Report | S |
| Venue URL | S |
| Advice of Charge | S |
| Local Content | S |
| Network Authentication Type with Timestamp | S |
| Service Information Request | Q |
| Service Information Response | S |

All elements in Table 9 are defined in the IEEE 802.11-216, except Service Information Request and Service Information Response, which may be defined in PAD. Service Information Request and Service Information Response may allow queries to a SIR directly through a "pass-through" mode of the AP in pre-authentication state.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a station (STA), the method comprising:
   receiving in a pre-association discovery state, from an Access Point (AP), a frame indicating support for one or more Medium Access Control (MAC) address selection mechanisms;
   transmitting in a pre-association discovery state, to the AP, an Access Network Query Protocol (ANQP) request message requesting information indicative of one or more of the supported MAC address selection mechanisms;
   receiving in a pre-association discovery state, from the AP, an ANQP response message that includes a bitmap indicating at least one supported MAC address selection mechanism and a field indicating prefix information to be used for MAC address selection; and
   transmitting in a pre-association discovery state, to the AP, an association request frame including a local MAC address that is determined based on the bitmap indicating the at least one supported MAC address selection mechanism and based on the field indicating the prefix information to be used for selecting a MAC address.

2. The method of claim 1, wherein the received frame comprises an Extended Capabilities Element.

3. The method of claim 1, wherein the received frame indicating support for one or more MAC address selection mechanisms is one of a beacon frame or a probe response frame.

4. The method of claim 1, wherein the ANQP response message indicates support for at least a self-selection mechanism.

5. The method of claim 4, wherein the local MAC address is self-selected by the STA from a range of MAC addresses.

6. The method of claim 1, wherein the local MAC address is an identifier associated with a Structured Local Address Plan (SLAP) quadrant.

7. The method of claim 1, wherein the ANQP response message further includes a field indicating one or more prefixes to be used for selecting a MAC address.

8. A station (STA) comprising:
   a receiver configured to receive in a pre-association discovery state, from an Access Point (AP), a frame indicating support for one or more Medium Access Control (MAC) address selection mechanisms;
   a transmitter configured to transmit in a pre-association discovery state, to the AP, an Access Network Query Protocol (ANQP) request message requesting information indicative of the one or more supported MAC address selection mechanisms;
   the receiver further configured to receive in a pre-association discovery state, from the AP, an ANQP response message that includes bitmap indicating at least one supported MAC address selection mechanism and a field indicating prefix information to be used for selecting a MAC address; and
   the transmitter further configured to transmit in a pre-association discovery state, to the AP, an association request frame with a local MAC address that is determined based on the bitmap indicating the at least one supported MAC address selection mechanism and based on the field indicating prefix information to be used for selecting a MAC address.

9. The STA of claim 8, wherein the received frame comprises an Extended Capabilities Element.

10. The STA of claim 8, wherein the received frame indicating support for one or more MAC address selection mechanisms is one of a beacon frame or a probe response frame.

11. The STA of claim 8, wherein the ANQP response message indicates support for at least a self-selection mechanism.

12. The STA of claim 11, wherein the local MAC address is self-selected by the STA from a range of MAC addresses.

13. The STA of claim 8, wherein the local MAC address is an identifier associated with a Structured Local Address Plan (SLAP) quadrant.

14. The STA of claim 8, wherein the ANQP response message further includes a field indicating one or more prefixes to be used for selecting a MAC address.

15. An Access Point (AP) comprising:

a transmitter configured to transmit a frame indicating support for one or more Medium Access Control (MAC) address selection mechanisms;

a receiver configured to receive, from a station (STA), an Access Network Query Protocol (ANQP) request message requesting information indicative of the one or more supported MAC address selection mechanisms;

the transmitter further configured to transmit, to the STA, an ANQP response message that includes a bitmap indicating at least one supported MAC address selection mechanism and a field indicating prefix information to be used for selecting a MAC address; and the receiver further configured to receive, from the STA, an association request frame with a local MAC address that is determined in accordance with the bitmap indicating the at least one supported MAC address selection mechanism and in accordance with the field indicating prefix information to be used for selecting a MAC address.

16. The AP of claim 15, wherein the transmitted frame comprises an Extended Capabilities Element.

17. The AP of claim 15, wherein the transmitted frame indicating support for one or more MAC address selection mechanisms is one of a beacon frame or a probe response frame.

18. The AP of claim 15, wherein the ANAP response message indicates support for at least a self-selection mechanism.

19. The AP of claim 15, wherein the local MAC address is an identifier associated with a Structured Local Address Plan (SLAP) quadrant.

20. The AP of claim 15, wherein the ANQP response message further includes a field indicating one or more prefixes to be used for selecting a MAC address.

* * * * *